Dec. 19, 1961

C. L. SHARP 3,013,826

PACKING ASSEMBLY

Filed Dec. 30, 1957

INVENTOR.
CHESTER L. SHARP
BY *Jerry J Dunlap*
ATTORNEY

United States Patent Office 3,013,826
Patented Dec. 19, 1961

3,013,826
PACKING ASSEMBLY
Chester L. Sharp, Tulsa, Okla., assignor to Douglas O. Johnson and Leo W. Fagg, doing business as Johnson-Fagg Engineering Company, Tulsa, Okla., co-partners
Filed Dec. 30, 1957, Ser. No. 706,109
2 Claims. (Cl. 286—33)

This invention relates to improvements in packing assemblies of the type used for preventing leakage around rods and shafts, and is particularly adapted to prevent leakage around a reciprocating rod or shaft such as may be found in various types of pumps.

As it is well known in the art, it is difficult to prevent leakage of fluid around a pump rod extending through one end of a pump housing, particularly when the pressure of the fluid in the pump housing is relatively high. It has heretofore been the practice to provide a tubular housing or packing gland on the end of the pump housing to loosely receive the pump rod and compressing a series of packing rings in the annulus between the pump rod and the inner periphery of the packing gland. These packing rings take various forms, such as V-shaped or U-shaped in cross section, and are of a width slightly larger than the distance between the pump rod and the inner periphery of the packing gland in order that the rings are wedged into the packing gland and provide a seal around the pump rod. With this type of packing assembly, the friction of the pump rod on the inner edges of the packing rings, in combination with the changes in pressure of the fluid being packed-off, has a substantial tendency to move the packing rings in the packing gland and, if the rings are not compressed with a very substantial force, they will be reciprocated in the packing gland and the outer edges of the rings will become worn in a very short time. Furthermore, packing rings of this type do not wear evenly, and a very small portion of the rings carry the entire fluid pressure load at any one time.

The present invention contemplates a packing assembly using a combination of packing and sealing rings held in a packing gland by non-compressible retainer rings in such a manner that only a minor portion of the cross sectional area of each packing ring is subjected to a varying fluid pressure. The major portion of the cross sectional area of each packing ring is pre-stressed or pre-compressed with a force sufficient to prevent any reciprocating movement of the packing rings with the rod or shaft extending through the packing gland, and the sealing rings are retained stationary at all times in engagement with the inner periphery of the packing gland to prevent leakage of fluid around the outer edges of the packing rings. With this type of assembly, the total force imposed on the packing rings by the fluid being packed-off is materially reduced, the working pressure is distributed more uniformly through all of the packing rings, and the wear of the packing rings will be substantially uniform to materially increase the service life of the packing assembly.

An important object of this invention is to minimize the leakage of high pressure fluid through a packing gland having a movable shaft extending therethrough.

Another object of this invention is to provide a packing gland assembly requiring a minimum of attention and service.

A further object of this invention is to distribute the pressure or working load on a series of packing rings in a packing gland.

Another object of this invention is to provide a means for pre-compressing packing rings in a packing gland such that the packing rings will not be reciprocated in the gland by a shaft moving through the packing rings.

A still further object of this invention is to provide a packing assembly for a packing gland surrounding a movable shaft which is simple in construction, will have a long service life and which may be economically manufactured.

Other objects and advantages of the invention will be evident from the following detailed description, when read in conjunction with the accompanying drawings which illustrate my invention.

Figure 1:
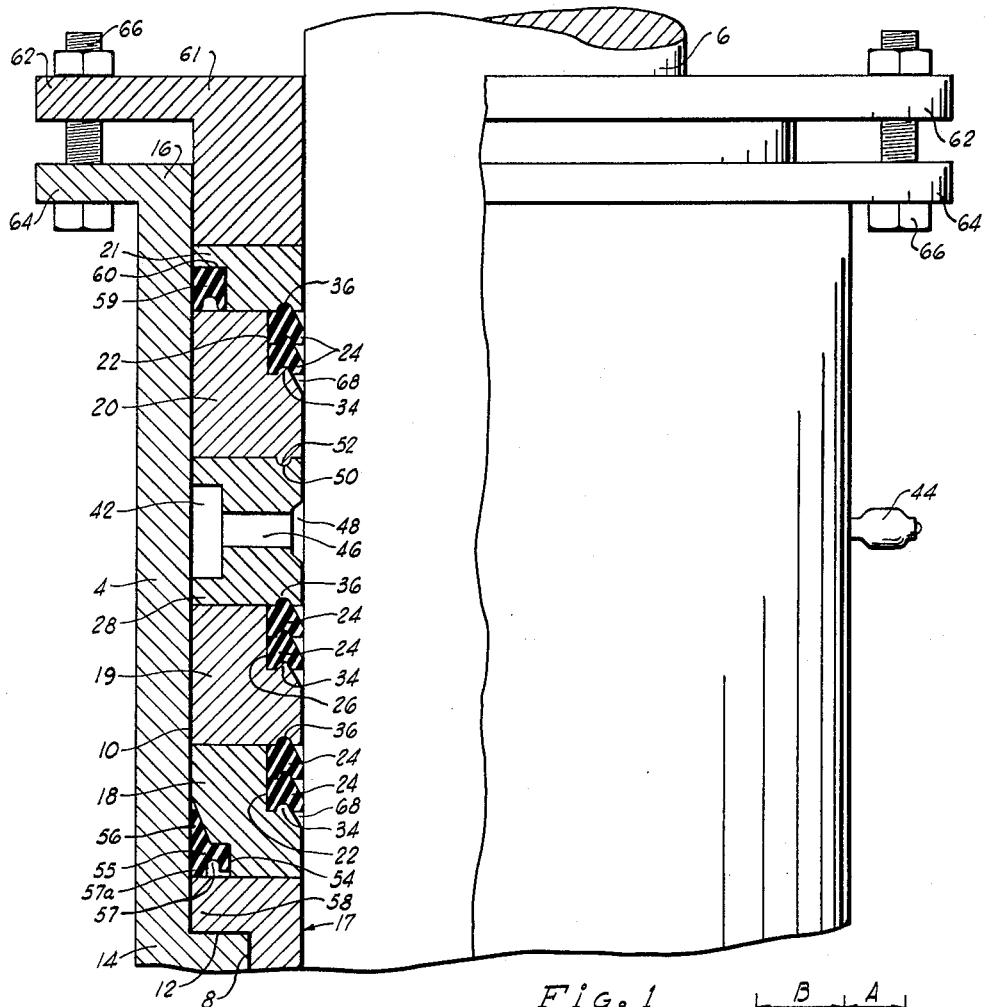
FIGURE 1 is an elevational view of a packing gland containing my novel packing assembly, with one side of the gland and assembly shown in section to illustrate details of construction.

Referring to the drawings in detail, and particularly FIG. 1, reference character 4 designates a tubular housing such as may be provided on the end of a reciprocating pump (not shown) to form a packing gland around a shaft or rod 6. The bore 8 through the housing 4 is larger in diameter than the diameter of the shaft 6 to provide a loose fit of the shaft 6 in the bore, and a counter-bore 10 is provided in the housing 4 concentrically around the bore 8 to provide an outwardly facing shoulder 12 adjacent the inner end 14 of the housing. The counter-bore 10 extends from the shoulder 12 to the outer end 16 of the housing. The present packing assembly, generally designated by reference character 17, is inserted in the housing 4 to prevent the leakage of fluid around the shaft 6 from the inner end 14 to the outer end 16 of the housing.

The packing assembly 17 includes two pairs of non-compressible retainer rings 18 and 19 and 20 and 21 positioned in the counter-bore 10 around the shaft 6 in end-to-end relation. Each of the retainer rings 18 through 21 has an inner diameter of a size to provide a sliding fit of the ring on the shaft 6 and the outer diameter of each retainer ring is of a size to provide a sliding fit of the ring in the counter-bore 10. Each of the innermost rings (18 and 20) of the two pairs of retaining rings is provided with a counter-bore 22 in the outer end thereof to receive a pair of packing rings 24. The packing rings 24 are held in the respective counter-bores 22 by the outer retainer rings 19 and 21 in positions such that the packing rings 24 provide a fluid tight seal between the retainer rings 18 and 20 and the outer periphery of the shaft 6. If the fluid pressure at the inner end 14 of the housing 4 is sufficiently high, I may also provide a counter-bore 26 in the outer end of the retainer ring 19 to receive another pair of packing rings 24. The last-mentioned packing rings are held in the counter-bore 26 by a lubricating ring 28 as will be more fully hereinafter set forth.

Figure 2:
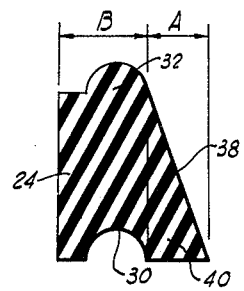
FIGURE 2 is an enlarged cross section of a preferred packing ring.

The preferred packing ring construction is illustrated in FIG. 2 and comprises a generally rectangular-shaped body having a circumferential groove 30 in the inner end thereof and a circumferential shoulder or bead 32 on the outer end thereof. The grooves 30 of the inner packing rings receive complementary shoulders 34 (FIG. 1) formed in the inner ends of the counter-bores 22 and 26, and the flanges 32 of the outer packing rings are received in complementary grooves 36 formed in the inner ends of the retainer rings 19 and 21 and the lubricating ring 28. The inner periphery 38 (FIG. 2) of each packing ring 24 is tapered inwardly from the respective flange 32 on the outer end of the packing ring to a point inwardly of the respective groove 30 in the inner end of the packing ring to provide a lip 40 extending inwardly from the main body portion of the packing ring. Each lip 40 is of a size to engage the outer periphery of the shaft 6 and provide a seal around the shaft. It will thus be apparent that each packing ring 24 is held between a pair of the retainer rings through the portion of its width designated by the letter B in FIG. 2, and the lip 40, having its width designated by the letter A in FIG. 2, extends inwardly from contact with the retainer rings for movement independently of the retainer rings. The portion B of each packing ring should be substantially larger than the portion A thereof to assure that the packing ring will be retained in its proper position and will not be moved when the shaft 6 is moved. I prefer that the portion B of each packing ring be at least twice as wide as the portion A, as will be more fully hereinafter set forth.

The lubricating ring 28 (FIG. 1) is provided with a circumferential groove 42 in the outer periphery thereof to communicate with a suitable grease fitting 44 secured in the side of the housing 4. One or more transverse passageways 46 extend through the lubricating ring 28 between the groove 42 and another circumferential groove 48 formed in the inner periphery of the lubricating ring 28. Thus, lubricant injected through the fitting 44 will be directed through the groove 42, passageway 46 and groove 48 to lubricate the entire periphery of the shaft 6 opposite the groove 48. Also, since the shaft 6 reciprocates through the housing 4, the lubricant supplied through the inner groove 48 will be distributed over a substantial length of the shaft 6. If desired, a small circumferential groove 50 may be formed in the outer end of the lubricating ring 28 to receive a complementary flange 52 on the inner end of the retaining ring 20, to minimize leakage between the respective rings.

The innermost retainer ring 18 is provided with a circumferential groove 54 in the outer periphery thereof to receive a sealing ring 55 and seal the ring 18 in the counter-bore 10. In lower pressure environments, the sealing ring may be U-shaped or O-shaped in cross section. However, in high pressure environments, an outwardly tapered flange 56 is preferably formed on the outer end of the sealing ring 55 and the outer portion of the groove 54 is similarly tapered in order that the flange 56 will be wedged against the inner periphery of the housing 4 when the retainer ring 18 is forced into the inner end of the counter-bore 10, as will be more fully hereinafter set forth. The inner end of the sealing ring 55 is provided with a circumferential groove 57, and the portion of the ring outwardly of the groove 57 is extended toward the end of the counter-bore 10 a greater distance than the portion of the ring inwardly of the groove 57 to form a lip 57a on the outer edge of the ring 55. Thus, any fluid leaking outwardly along the inner end of the retainer ring 18 will tend to expand the lip 57a into tighter contact with the inner periphery of the housing 4 and enhance the seal around the retainer ring 18.

An insert ring 58 is normally provided in the bore 8 of the housing 4 by the pump manufacturer to form a bushing for the shaft 6. The outer end of the ring 58 extends radially outward over the inner end 12 of the counter-bore 10 and receives the inner end of the retainer ring 18. It will be understood, however, that if the insert ring or bushing 58 is not provided, the retainer ring 18 and the lip 57a of the sealing ring 55 may be held against the shoulder 12 and the packing assembly 17 will work equally well.

An additional sealing ring 59 is provided in a circumferential groove 60 formed in the outer periphery of the retainer ring 21 to seal the outer end portion of the packing assembly 17 in the counter-bore 10. The sealing ring 59 ordinarily seals off a minor amount of fluid, such as the fluid which may leak outwardly between the retainer ring 20 and the lubricating ring 28. Therefore, the sealing ring 59 is not subjected to either a substantial pressure variation or movement of the surfaces being sealed-off and may take any suitable form, such as the generally U-shape, as shown, or the form of an O-ring, not shown.

The retainer rings 18 through 21 and lubricating ring 28 are held in assembly in the housing 4 by means of a pressure ring 61 inserted in the outer end of the counter-bore 10. The pressure ring 61 is of a length to extend from the outer retainer ring 21 beyond the outer end 16 of the housing 4. A circumferential flange 62 is formed around the outer end of the pressure ring 61, and a complementary flange 64 is formed on the outer end 16 of the housing 4. The flanges 62 and 64 are apertured to receive bolts 66 and secure the pressure ring 61 in the housing 4.

In assembling the present packer assembly, the retainer rings 18 through 21 and lubricating ring 28 are inserted in the counter-bore 10 in the positions shown in FIG. 1, with the packing rings 24 in the counter-bores 22 and 26 and sealing rings 55 and 59 in the grooves 54 and 60. The pressure ring 61 is then inserted in the outer end of the counter-bore 10 and is connected to the flange 64 by the bolts 66. The nuts on the bolts 66 are tightened to force the pressure ring 61 into the housing 4 with a force at least as great as the pressure of the fluid tending to leak through the housing 4 around the shaft 6. This force is transmitted from the pressure ring 60 through the retainer rings 18 through 21 and the lubricating ring 28 to wedge the flange 56 of the sealing ring 55 against the inner periphery of the housing 4. Also, the packing rings 24 are of a size such that the outer packing ring 24 of each set protrudes beyond the outer end of the respective counter-bore 22 or 26 when the packing rings are not compressed. Therefore, the force transmitted by the pressure ring 61 will also be imposed on the portion B of each packing ring 24. The sizes of the packing rings 24 should be correlated with the sizes of the counter-bores 22 and 26 such that a force at least as great as the pressure of the fluid being sealed-off is imposed on the packing rings before the retainer and lubricating rings are brought into contact. However, the bolts 66 should be tightened until the retainer and lubricating rings are forced into end-to-end contact as shown in FIG. 1.

When the portions B of the packing rings 24 are compressed with a force at least as great as the pressure of the fluid being sealed-off, the fluid will contact only the lip portion 40 of each packing ring and will not work its way around the flange 32 or through the groove 30 of each packing ring where it would tend to move the packing rings 24 when the pressure is varied by reciprocation of the shaft 6. I prefer to provide an inwardly extending tapered portion 68 at the inner end of each of the counter-bores 22 and 26 inwardly of the respective flange 34 to facilitate contact of the lips 40 with the working fluid. Thus, the fluid tending to flow along the shaft 6 will contact each lip 40 and force the lip 40 inwardly into tighter contact with the shaft 6. It should also be noted that since the packing rings 24 are held rigidly in the counter-bores 22 and 26, only the lips 40 will be moved during reciprocation of the shaft 6, and only the lips 40 will be subjected to wear.

Any fluid leaking around the insert ring 58 or between the insert ring 58 and the inner end of the inner retainer ring 18 will be sealed-off by the inner sealing ring 55. Also, the outer sealing ring 59 prevents leakage around the outer retainer ring 21 of any fluid which may leak outwardly between the retainer ring 20 and the lubricating ring 28. Thus, the combination of the packing rings 24 and the sealing rings 55 and 59 effectively prevents leakage of fluid through the housing 4 around the shaft 6.

Figure 3:
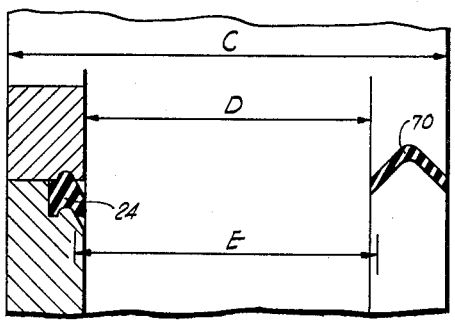
FIGURE 3 is a schematic drawing illustrating the differences in pressure areas of the packing rings of the present assembly and those of present day packing assemblies.

The schematic illustration shown in FIG. 3 is provided to graphically illustrate the difference in pressure areas of a packing ring in the present assembly and a packing ring in a conventional packing assembly. The V-shaped packing ring 70 shown on the right hand side of FIG. 3 is typical of a present day packing ring. In using this type of packing ring, a series of the rings are placed in end-to-end relation around a shaft within a packing gland and are forced together with a force sufficient to prevent leakage around the shaft. The fluid being sealed-off contacts the entire width of this type of packing ring assembly, as indicated by the difference in areas denoted by the two dimension lines C and D. Thus, variations in the pressure of the fluid being sealed-off will provide reciprocation of the rings 70 and induce wear on both the inner and outer peripheries of the rings. As a result, the outer edges of packing rings of the type shown at 70 frequently wear out before the inner edges of the rings.

When using a packing assembly of the present invention, as illustrated on the left hand side of FIG. 3, the area of the packing ring 24 contacted by the fluid being sealed-off is indicated by the difference between the two dimension lines D and E. The remaining cross sectional area of the packing ring 24 is, as previously described, held in a stationary position and compressed by a force greater than the pressure of the fluid being sealed-off, whereby the major portion of the packing ring is not subjected to the fluid pressure. A comparison of the area denoted by the difference between the lines D and E and the area denoted by the lines C and D clearly shows that the total force imposed by the fluid being sealed-off is substantially less in the present invention than in conventional packing assemblies, to localize points of wear of the packing rings and to greatly minimize the possible points of leakage through a packing gland. It may also be noted that a packing assembly constructed in accordance with the present invention need not be periodically tightened, as in packing assemblies using conventional packing rings extending from the outer periphery of the shaft to the inner periphery of the packing gland.

It will be appreciated that the arount of fluid pressure which can be sealed-off by each packing ring 24 will be limited to the materials of construction. In higher fluid pressure environments the number of packing rings 24 is increased to provide an effective seal around the movable shaft. Any desired number of packing rings 24 may be used in a single retainer ring counter-bore, although I prefer to use two or three packing rings 24 in each of the innermost retainer rings to more precisely control the amount of compression force induced in the rings. However, in low pressure environments I may use a single packing ring 24 and a single sealing ring 55 or 59 in the packing gland assembly.

From the foregoing it will be apparent that the present invention will facilitate the packing-off of any desired fluid pressure around a movable shaft. The packing rings will be subjected to a more uniform wear than in present packing assemblies to materially increase the service life of a packing assembly. Also, the present invention provides a packing assembly which will require a minimum of maintenance. Furthermore, the present packing assembly is simple in construction and may be economically manufactured.

Changes may be made in the combination and arrangement of parts or elements as heretofore set forth in the specification and shown in the drawings, it being understood that changes may be made in the precise embodiments shown without departing from the spirit and scope of the invention as defined in the following claims.

I claim:

1. In a packing assembly used to prevent fluid leakage around a moving shaft from a high pressure on one side of the packing assembly to a low pressure on the other side thereof, the packing assembly having a pair of incompressible retainer rings forming an annular groove therebetween, the groove being in facing relation to the shaft, and means for clamping the retainer rings together; an improved packing ring comprising a circular ring fabricated of a resilient material, the cross section of the packing ring being characterized by a generally rectangular root portion at the outer periphery thereof and a generally right triangular portion at the inner periphery thereof, the right triangular portion having one leg adjacent to and integral with the root portion, the other leg being disposed generally at right angles to the fluid pressure to be retained with the hypotenuse sloping away from the shaft and away from the face exposed to the high pressure, the rectangular root portion and the leg exposed to the pressure being so dimensioned relative to the dimensions of the packing assembly that the root portion and the triangular portion along the hypotenuse will be axially compressed by the retainer rings and the triangular portion extends into contact with and is compressed by the shaft.

2. In combination; a tubular housing having a moveable shaft extending therethrough, the tubular housing being exposed to fluid under pressure at a first end thereof and having a counterbore extending from a second end thereof toward the first end, and a packing assembly for preventing flow of fluid between the housing and shaft from the first end to the second end of the housing; the packing assembly comprising first and and second noncompressible retainer rings in abutting relationship in the housing counterbore and disposed around the shaft, the first retainer ring being adjacent the first end of the tubular housing, each of said retainer rings having an inner diameter of a size to provide a sliding fit around the shaft and an outer diameter of a size to provide a sliding fit thereof in the housing counterbore, the first retainer ring having a circumferential groove in the outer periphery thereof, a sealing ring in the circumferential groove of a size to seal the first retainer ring in the housing counterbore and prevent fluid passage between the housing and the first retainer ring, one of the retainer rings having a counterbore in the end thereof adjacent the other retainer ring, at least one resilient packing ring in the retainer ring counterbore, the packing ring being sized, when not compressed, to extend beyond the respective end of the retainer ring having the counterbore, the packing ring being characterized by a cross section having a generally rectangular root portion at the outer periphery thereof and a generally right triangular portion at the inner periphery thereof, the right triangular portion having one leg adjacent to and integral with the root portion, the other leg being disposed generally at right angles to the fluid pressure to be retained and aligned with one side of the rectangular root portion, the hypotenuse sloping away from the rod and away from the face exposed to the pressure, and means for forcing the retainer rings together to compress the packing ring with a force at least as great as that force exerted on the packing ring by the fluid under pressure.

References Cited in the file of this patent

UNITED STATES PATENTS

| | | |
|---|---|---|
| 1,780,764 | Noble | Nov. 4, 1930 |
| 1,842,942 | Mellor | Jan. 26, 1932 |
| 2,673,103 | Tremolada | Mar. 23, 1954 |
| 2,706,655 | Showalter | Apr. 19, 1955 |
| 2,757,993 | Flick | Aug. 7, 1956 |
| 2,806,721 | Flagg et al. | Sept. 17, 1957 |

FOREIGN PATENTS

| | | |
|---|---|---|
| 505,024 | Great Britain | May 3, 1939 |
| 694,392 | Germany | July 4, 1940 |